(12) United States Patent
Deng et al.

(10) Patent No.: US 11,481,580 B2
(45) Date of Patent: Oct. 25, 2022

(54) ACCESSIBLE MACHINE LEARNING

(71) Applicant: FUJITSU LIMITED, Kawasaki (JP)

(72) Inventors: Li Deng, Menlo Park, CA (US); Suhas Chelian, San Jose, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 1173 days.

(21) Appl. No.: 15/994,788

(22) Filed: May 31, 2018

(65) Prior Publication Data

US 2019/0370600 A1 Dec. 5, 2019

(51) Int. Cl.
*G06K 9/62* (2022.01)
*G06N 20/00* (2019.01)

(52) U.S. Cl.
CPC ............ *G06K 9/626* (2013.01); *G06K 9/623* (2013.01); *G06K 9/6282* (2013.01); *G06N 20/00* (2019.01)

(58) Field of Classification Search
CPC ...... G06K 9/626; G06K 9/623; G06K 9/6282; G06N 20/00
See application file for complete search history.

(56) References Cited

U.S. PATENT DOCUMENTS

| | | | | |
|---|---|---|---|---|
| 5,263,124 A * | 11/1993 | Weaver | ................. | G06K 9/6282 382/226 |
| 5,634,087 A * | 5/1997 | Mammone | ........... | G06K 9/6282 706/41 |
| 6,519,580 B1 * | 2/2003 | Johnson | ................. | G06N 5/025 707/E17.058 |
| 7,856,351 B2 * | 12/2010 | Yaman | ................ | G10L 15/1815 704/4 |
| 8,249,885 B2 * | 8/2012 | Berkowitz | ......... | G06Q 30/0625 705/1.1 |
| 8,725,661 B1 * | 5/2014 | Goldman | ............... | G06N 5/003 706/12 |

(Continued)

FOREIGN PATENT DOCUMENTS

| WO | WO-2008086126 A1 * | 7/2008 | ....... G06F 17/30327 |
|---|---|---|---|
| WO | WO-2016004075 A1 * | 1/2016 | ........... G06F 9/5066 |

OTHER PUBLICATIONS

Esposito et al., "A Comparative Analysis of Methods for Pruning Decision Trees"; (pp. 476-491) (Year: 1997).*

(Continued)

*Primary Examiner* — Manav Seth
(74) *Attorney, Agent, or Firm* — Maschoff Brennan

(57) ABSTRACT

According to an aspect of an embodiment, a method may include obtaining a data set that includes categories (or features), and a target criteria. The method may further include obtaining a first decision tree model using the data set. The method may further include ranking the categories based on the first decision tree model and removing low-ranking categories from the data set. The method may further include generating a second decision tree model using the data set. The second decision tree model may include branch nodes. Each of branch nodes may represent a branch criteria. The method may further include pruning a branch node. The method may further include designating a remaining branch nodes as a rule node. The method may further include generating a rule based on the branch criteria of the rule node and presenting the rule in a graphical user interface.

20 Claims, 9 Drawing Sheets

(56) References Cited

U.S. PATENT DOCUMENTS

| | | | | |
|---|---|---|---|---|
| 8,788,443 | B2* | 7/2014 | Hoffmann | G06N 20/00 |
| | | | | 706/20 |
| 9,779,407 | B2* | 10/2017 | Adjaoute | G06Q 40/08 |
| 10,210,461 | B2* | 2/2019 | Biem | G06N 20/00 |
| 10,275,867 | B1* | 4/2019 | Pathapati | G06T 7/0002 |
| 10,303,771 | B1* | 5/2019 | Jezewski | G06K 9/627 |
| 10,489,512 | B2* | 11/2019 | Jezewski | G06K 9/6267 |
| 10,572,333 | B2* | 2/2020 | Lu | G06F 11/079 |
| 10,984,517 | B2* | 4/2021 | Pathapati | G06F 8/38 |
| 11,115,421 | B2* | 9/2021 | Nevatia | G06F 21/604 |
| 11,227,121 | B2* | 1/2022 | Jezewski | G06F 40/216 |
| 2015/0046181 | A1* | 2/2015 | Adjaoute | G06Q 10/10 |
| | | | | 705/2 |
| 2021/0133595 | A1* | 5/2021 | Watanabe | G06N 5/003 |
| 2022/0132748 | A1* | 5/2022 | Vild | A01G 7/06 |
| | | | | 47/1.7 |

OTHER PUBLICATIONS

"Plot C5.0 decision trees in R", Sep. 23, 2014.

Frank et al., "The WEKA Workbench" Data Mining, Practical Machine Learning Tools and Techniques, Sep. 4, 2018.

Kuhn et al., "A Short Tour of the Predictive Modeling Process", Springer Science, Jan. 2013.

EP Office Action in application No. 18210633.6 dated Jul. 10, 2019.

EP Search Report in Application No. 18 210 633.6 dated Apr. 9, 2021.

Caruana et al. "Intelligible models for healthcare: Predicting pneumonia risk and hospital 30-day readmission" Proceedings of the 21th ACM SIGKDD International Conference on Knowledge Discovery and Data Mining, pp. 1721-1730, Aug. 10, 2015.

Demiralp et al. "Foresight: Recommending Visual Insights" Proceedings of ACM SIGKDD, Aug. 14, 2017.

Facets "Visualizations for Machine Learning" datasets 2017, https://pair-code.github.io/facets.

Gkatzia et al. "Data-to-Text Generation Improves Decision-Making Under Uncertainty" IEEE Computational Intelligence Magazine, Dec. 10-17, 2017.

Lakkaraju et al. "Interpretable decision sets: A joint framework for description and prediction" Proceedings of the 22nd ACM SIGKDD International Conference on Knowledge Discovery and Data Mining, 1675-1684, Aug. 2016.

Letham et al. "Interpretable classifiers using rules and Bayesian analysis: Building a better stroke prediction model" The Annals of Applied Statistics, Institute of Mathematical Statistics, 1350-1371, Sep. 2015.

Li et al. "Feature Selection: A Data Perspective" www.ResearchGate.net, Sep. 7, 2016.

UCI Adult "Adult Data Set" UCI Machine Learning Repository [http://archive.ics.uci.edu/ml]. Irvine, CA: University of California, School of Information and Computer Science. 2017.

Ustun et al. "Supersparse Linear Integer Models for Predictive Scoring Systems" AAAI (Late-Breaking Developments) Jun. 2013.

* cited by examiner

ACCESSIBLE MACHINE LEARNING

FIELD

The embodiments discussed in the present disclosure are related to accessible machine learning.

BACKGROUND

Businesses and institutions receive, generate, store, search, retrieve, and analyze large amounts of data in the course of daily business or activities. Machine learning may be used to help business and institutions to understand and interpret the data. For example, using machine learning to analyze data may allow business and institutions to understand how changes in their operations may affect certain outcomes, such as increase in sales. Implementing machine learning on data stores has typically been implemented by machine learning experts as the process may be complicated and involve expertise in machine learning, artificial intelligence, statistics, or computer coding.

SUMMARY

According to an aspect of an embodiment, a method of providing accessible machine learning may be presented in the present disclosure. The method may include obtaining a data set that includes multiple records. Each of the records may include values in multiple categories, and one of the categories may be a target category. The method may further include obtaining an indication of a target criteria, where a first set of records of the records may each include a first target value of the target category that meets the target criteria. The method may further include obtaining a first decision tree model using the data set, where the first decision tree model may represent relationships between the values of the categories of the records and the target criteria. The method may further include ranking the categories based on the first decision tree model and based on relationships between values of the ranked categories and the target criteria. The method may also include removing one or more low-ranking categories from the records of the data set based on the ranking of the low-ranking categories. The method may additionally include generating a second decision tree model using the data set with the low-ranking categories removed from the data set, where the second decision tree model may include a root node, leaf nodes, and branch nodes, and where each of the branch nodes represents a branch criteria of one of the categories. The branch criteria for each of the branch nodes may be selected based on relationships between the first target values that meet the target criteria and values of the one of the categories that meet the branch criteria. The method may further include pruning a branch node of the branch nodes, where the pruned branch node may be selected for pruning based on a second set of records of the data set associated with the pruned branch node that includes more records. The method may further include designating at least one of the remaining branch nodes as a rule node, and generating a rule based on the branch criteria of the rule node. The method may also include presenting the rule on a display in a graphical user interface.

The object and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
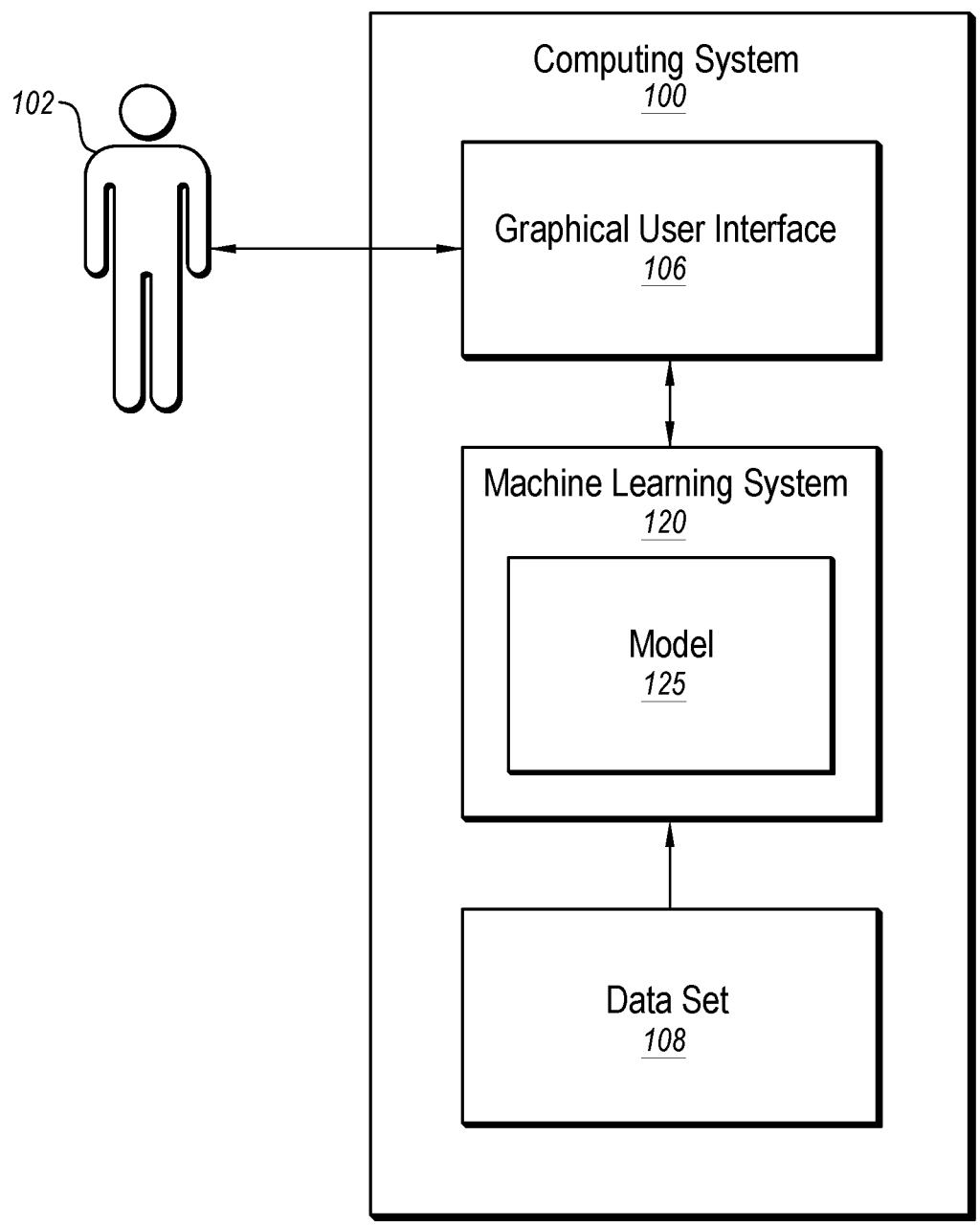
FIG. 1 is an example environment that includes accessible machine learning.

Machine learning is a field of computer science that may give computer systems the ability to "learn" (i.e., progressively improve performance on a specific action) with data, without being explicitly programmed. In the present disclosure, the term "machine learning" may be an inclusive term referring to machine learning, artificial intelligence, pattern recognition, and/or data mining. Machine learning may involve "training" an algorithm or model with training data which includes input data and desired results or outputs. The algorithm or model may "learn," or adapt, to predict when a desired result may occur based on the input data. The algorithm or model may be used on new data to classify the new data or predict new results. Some example applications of machine learning include email filtering, optical character recognition, and computer vision.

In some circumstances, machine learning experts configured and operated machine-learning systems. The experts selected algorithms, provided training data, and supervised the machine-learning system training of models. Further, the experts interpreted the results of the machine-learning systems and/or oversaw implementation of the machine-learning system.

Systems and methods related to accessible machine learning are disclosed in the present disclosure. Accessible machine learning may include systems or methods that may enable users to use machine learning without special knowledge of machine learning, artificial intelligence, statistics, or computer coding. Additionally or alternatively, accessible machine learning may include systems or methods that may provide users that have special knowledge of machine learning with additional tools for using machine learning.

For example, the systems and methods of the present disclosure may help to enable a user to use a machine-learning system to perform a specific task. To help enable the use of a machine-learning system, the user may be provided with a graphical user interface (GUI) for the machine-learning system. Using the GUI, a data set may be imported into the machine-learning system. The imported data set may serve as training data for a model developed by the machine-learning system. The model may be used to perform the specific task. For example, the model may be used to predict an outcome relative to the specific task based on the values of the model with respect to the data. For example, a data set related to many sales engagements, some of which resulted in sales, may be used as training data to generate a model configured to predict whether a sales engagement may occur or not based on data provided to the model.

The GUI may provide an interface for a user to construct, validate, and use a model generated by the machine-learning system based on the data set. For example, the data set, and/or the model may include multiple records. The records may include values in multiple categories, which may be known in the art as "features." Thus, in the present disclosure it may be said that the data set, the model, and/or records have values "in" or "of" multiple categories. For example, a record may have a value of a category related to "age" and another value of a category related to "profession."

One or more of the categories may be designated as a "target category." The target category may be a category of relevance to the specific task of the machine-learning model. In the present disclosure, values of the target category in the data set may be referred to as "target values." Through the GUI, a user may select the target category of the data set.

Additionally or alternatively, there may be a "target criteria" related to the specific task of the machine-learning model. The target criteria may include a logical test on the target values. Through the GUI, the user may input the target criteria. Records that meet the target criteria may be referred to as "wins." As known in the art, the records that meet the target criteria may be grouped or labeled as part of a "desired target class." Records that do not meet the target criteria may be referred to as "losses" and may be grouped with or labeled as part of a "less desired target class." Returning to the example given above, a user may indicate that records relating to sales engagements that resulted in sales may be "wins" and may be part of the "desired target class" while records relating to sales engagements that did not result in sales may be "losses" and may be part of the "less desired target class."

In some embodiments, each record may include a label. The label may indicate whether the record in which it is included is a "win" or a "loss." In some embodiments, the label may be related to the target criteria. For example, the target criteria may be "is annual income greater than $60,000?" Each record with a value in the target category of "annual income" that is greater than "$60,000" may also include a label of "win." In these or other embodiments, records may include a label that may be unrelated to a target category, and/or target values. In the present disclosure, the "target criteria" may be applied to the label. Also, in the present disclosure, the label may be considered a "target category." For example, the label may be considered the target category, and the target criteria may be "is the label 'win?'"

To aid a user in constructing, validating, and using the model generated by the machine-learning system, the machine-learning system, through the GUI, may assist a user to clean the data set by removing extraneous or poorly handled data from the data set. Additionally or alternatively, the GUI may provide an interface for the user to refine the model by removing categories from the model which may be less discriminative of the target category. For example, the data set may be analyzed and categories of the data set may be ranked in order of discriminability relationships to the target category. In the present disclosure, "discriminability relationships" may refer to a degree to which one category can be predicted based on values of another category. Relationships between values of one or more categories of "desired target class" may be compared with values of one or more categories of the "less desired target class." The GUI may display results of the analysis to the user. The user may select one or more of the categories of the data set for inclusion or exclusion from the model. Additionally or alternatively a visual representation of one or more categories of the model may be displayed to the user, through the GUI. Based on the visual representation, the user may be better able to understand the relationships between the categories and the target criteria.

Based on further analysis of the model, actionable insights based on the data set may be generated. The actionable insight may relate to a specific task of the machine-learning model The GUI may display the actionable insights to the user. The actionable insights may include rules or conclusions based on the model that the user may be able to understand and/or apply more easily than full details of the model itself. The actionable insight may be based on the target category and/or the target criteria.

Additionally or alternatively, the GUI may provide an interface for the user to use the model by testing hypothetical records or cases. The machine-learning system may classify the hypothetical cases based on the model. The GUI may provide results of the classification to the user. The machine-learning system, through the GUI, may assist the user in generating hypothetical cases that may demonstrate the actionable insights to the user. Through the testing of hypothetical cases, the user may be better able to understand the actionable insights. Additionally or alternatively, the GUI may provide alternate methods to change records from the less desirable classes to the more desirable classes through other manipulations of the data not suggested by the machine learning model.

The systems and methods of the present disclosure may relate to an improvement in computer-related technology because the systems and methods of the present disclosure may allow a computer to enable a user, without special knowledge of machine learning, to use a machine learning model. Previous machine-learning systems required the user to have special knowledge of machine learning, artificial intelligence, statistics and/or computer coding. Additionally, the present disclosure may relate to an improvement in the functioning of the computer itself because the systems and methods of the present disclosure may enable a computer to more efficiently generate and use a machine learning model. For example, by obtaining input from a user, that may be an expert in a domain related to the data set or the target category, the data set can be more effectively cleaned, and categories can be more effectively pruned, which may result in a more relevant data set. The use of a more relevant data set may yield faster processing and more accurate results, resulting in the improvement of the operation of the computer. Additionally or alternatively the systems and methods of the present disclosure may include a specific improvement over prior systems, including an improved user interface.

FIG. 1 is a block diagram of an example environment that includes accessible machine learning in accordance with at least one embodiment described in this disclosure. The environment may include a computing system 100 that includes a machine-learning system 120 that may be configured to implement a model 125 based on a data set 108. A user 102 may interact with the computing system 100 to perform one or more operations related to machine learning through a graphical user interface 106 ("GUI 106").

In some embodiments, the user 102 may be a person without special knowledge of machine learning, artificial intelligence, statistics, and/or computer coding. Alternatively or additionally, the user 102 may have special knowledge of machine learning, artificial intelligence, statistics, and/or computer coding. In some embodiments, the user 102 may have a specific task, a problem, or a question that could be analyzed or improved through applying machine learning to data. For example, a social scientist may have a questions regarding how to predict the income of a household based on data about the household.

In some embodiments, the user 102 may use the computing system 100 to perform one or more operations associated with machine learning. The computing system 100 may include one or more processors and one or more computer readable media. In some embodiments, the computing system 100 may include instructions stored in the computer readable media that when executed by the processors cause the computing system 100 to perform the operations described in this disclosure. In some embodiments, the computing system 100 may include a single computer, a server, a network of computers or servers, among other computing devices. Additionally or alternatively, the computing system 100 may include a mobile device, such as, for example a smart phone, tablet, or other mobile device.

In some embodiments, the computing system 100 may include the machine-learning system 120 which may include code and routines configured, when executed, to cause or direct a computing system to perform one or more operations associated with machine learning. Additionally or alternatively, the machine-learning system 120 may be implemented using hardware. Alternatively or additionally, the machine-learning system 120 may be implemented using a combination of hardware and software. In the present disclosure, operations described as being performed by machine-learning system 120 may include operations that the machine-learning system 120 may direct a system to perform.

In some embodiments, the computing system 100 may include the GUI 106. The GUI 106 may be configured as a user interface for the machine-learning system 120. The GUI 106 may be configured to receive inputs from the user 102 for the machine-learning system 120. Additionally or alternatively, the GUI 106 may be configured to present output and results from the machine-learning system 120 to the user 102. The machine-learning system 120 may also be configured to provide visual representations of outputs through the GUI 106.

In the present disclosure, operations performed by the computing system 100 and/or the machine-learning system 120 that may use the GUI may be referred to as being performed by the GUI. Further, in the present disclosure, references to the computing system 100 and/or the machine-learning system 120 displaying or presenting data or information to the user 102 should be understood to mean that the GUI 106 is used to display the data or information to the user 102. Likewise, in the present disclosure, references to the computing system 100 and/or the machine-learning system 120 receiving an input from the user 102 should be understood to mean that the GUI 106 is used to receive the input from the user 102, which may be conveyed to the computing system 100 and/or the machine-learning system 120.

In some embodiments, the computing system 100 may include the data set 108. The data set 108 may include multiple records. Each record may include multiple categories. Each of the categories of each of the records may include a value associated with the category. In some embodiments, the value may be, for example, a number, a character, a character string, a null value, or a selection from a list of options. For example, a record may include demographic data. In these and other embodiments, the categories may include "age," "gender," "annual income," "level of education," and "profession." Each of the categories may include a value. For example, the "age" category may include a number, the "gender" category may include a character or a selection from a list of options, and the "profession" category may include a character string.

In some embodiments, the machine-learning system 120 may perform one or more operations associated with machine learning with respect to the model 125. The model 125 may be based on the data set 108. For example, the machine-learning system 120 may import the data set 108 as a basis for the model 125. The model 125 may be any suitable model for machine learning, such as, for example, a decision tree, an association rule, an artificial neural network, an inductive logic program, or a support vector machine. In some embodiments, the machine-learning system 120 may use the model 125 to classify new data or to predict new results. In these and other embodiments, the model 125 may have been developed using training data related to the new data. For example, the training data may include values for multiple categories including, a target category. The new data may include values for one or more of the multiple categories but not the target category. The model 125 may predict whether the new data would have a particular value in the target category that meets a target criteria used when training the model 125. For example, the model 125 may be trained used demographic data, including income data, to predict whether a particular person will have an annual income greater than $60,000. In this example, the target category may be "annual income" and the target criteria may be an "annual income of greater than $60,000."

As an example of the computing system 100 performing one or more operations associated with machine learning, the data set 108 may be obtained. The data set 108 may be input into the computing system 100. After inputting the data set 108 into the computing, system 100 the GUI 106 may display statistics or metadata related to the data set 108. Additionally or alternatively, the data set 108 may be selected from available data sets accessible to the computing system 100. For example, there may be one or more available data sets stored at remote servers and accessible to the computing system 100 across a computer network, such as, for example the internet. The computing system 100 may display statistics or metadata of the one or more accessible data sets via the GUI 106. The data set 108 may be selected from among the accessible data sets.

In some embodiments, the machine-learning system 120 may obtain an indication of a target category, and/or a target criteria via the GUI 106. The target category may be a category of the categories of the data set. The target criteria may include a logical test based on the value in the target category. For example, the target category may be "annual income," and the target criteria may be "annual income greater than $60,000." The machine-learning system 120 may present, via the GUI 106, one or more categories of the data set 108. The target category may be selected via the GUI 106. The machine-learning system 120 may present one or more values of the target category via the GUI 106. The target criteria may be input via the GUI 106. For example, the machine-learning system 120 may present, via the GUI 106, one or more of the maximum, the minimum, the median, the average, or the $75^{th}$ percentile value of the target category. One of these values may be selected, or another value may be input to be used in the target criteria. The GUI 106 may display one or more logical test operators for the target criteria, for example "greater than," "less than," or "between." One of the logical test operators may be selected, or another logical test operator may be input to be included in the target criteria. In some embodiments, Boolean logic may be used to create a target criteria that involves more than one logical operator or more than one target category, for example, "annual income greater than $30,000 and annual income less than $90,000." Some records of the data set may include values of the target category that meet the target criteria. Additionally or alternatively, some records of the data set may include values of the target category that do not meet the target criteria.

Continuing the example of the computing system 100 performing one or more operations associated with machine learning, the machine-learning system 120 may import the data set 108. The machine-learning system 120 may perform operations related to "cleaning" the data set 108 in connection with importing the data set 108. Cleaning the data set 108 may include removing from consideration one or more categories of data set 108. Additionally or alternatively, cleaning the data set 108 may include removing one or more values from consideration. The machine-learning system 120 may obtain input for example, from the user 102, when determining which categories to remove from consideration. For example, the machine-learning system 120 may present, via the GUI 106, categories of the data set 108. One or more categories of the data set may be selected to be removed from consideration. For example, if the target criteria is "annual income of $60,000," the data category of "eye color" may be removed from consideration. Additionally or alternatively one or more values of one or more categories can be selected via the GUI 106; and the data set can be filtered based on the selected values. For example, in the "age" category, "greater than 18 years of age" may be selected or input. Records not including values in the "age" category that are greater than "18" may be removed from the data set.

In some embodiments, the user 102 may be seeking to analyze data relevant to a particular domain in which the user 102 has expertise. As such, the user 102 may have special knowledge about which categories may be relevant to the target category and/or which categories may not be relevant. In these or other embodiments the user 102 may have limitations on the data that the user 102 may include in the analysis, such as, for example, including only records from certain geographic areas.

In some embodiments, the model 125, such as, for example a decision tree model, may be obtained using, or based on the data set 108. The model 125 may represent relationships between the values of the categories of the records of the data set 108 and the target criteria. In some embodiments, the machine-learning system 120 may generate the model 125. Additionally or alternatively the model 125 may be obtained from another source.

In some embodiments, the machine-learning system 120 may perform category selection on the model 125. Category selection may include selecting categories of data that are to be considered with respect to the question or problem for which the model 125 is associated. For example, when a social scientist is considering data that affects income, the type of data selected may be arranged in categories. For example, the categories may include "education level," "age," "race," "gender," "marital status," among others. In these and other embodiments, the categories may also be known as features of the model 125.

Category selection may be performed using any suitable method, such as, for example, using a feature importance method, a univariate test, a filter method, a wrapper method or an embedded method, among other methods. Category selection may include ranking the multiple categories of the data set 108 or the model 125 and based on relationships between the values of the ranked categories and the target criteria. Based on the category selection, the machine-learning system 120 may generate relevance information corresponding to the categories of the data set 108. The machine-learning system 120 may present the relevance information via the GUI 106. One or more categories may be selected for removal from consideration based on the presented relevance information. For example, one or more low-ranking categories may be removed from the records of the data set based on the ranking of the low-ranking category. Removing a category from consideration may include removing the category from the model 125 or removing values of the category from the data set 108.

In some embodiments, the machine-learning system 120 may present, via the GUI 106, a visual representation of one or more categories of the data set. The visual representation may be based on relationships between the presented categories and the target category. For example, one or more categories may be presented via the GUI 106. The GUI may display relevance information relating to one or more categories of the data set. One of the categories may be selected. The selected category may be displayed in a visual representation. The relationships between the selected category and the target category may be presented in the visual representation. The visual representation may include a graphical display. Additionally or alternatively an indication of the number of records that satisfy various criteria of the selected category and the target category may be displayed. For example, if the target category is "annual income," and the selected category is "eye color," the GUI 106 may display a graph illustrating the distribution of incomes at several levels across the different eye colors. Additionally or alternatively the GUI 106 may display a number of incomes at several levels across the different eye colors.

In some embodiments, the machine-learning system 120 may generate a refined model, such as, for example a refined decision tree model, based on, or using, the data set without the removed categories, or low-ranking, categories. For example, the model may be a decision tree model, which may include a root node, multiple branch nodes and multiple leaf nodes. The branch nodes of the decision tree model may each represent a branch criteria of one of the multiple categories of the data set 108. In these and other embodiments, the branch criteria may apply to one of the categories that may not be the target category to which the target criteria applies.

In some embodiments, the branch criteria of each of the branch nodes may be selected based on relationships between values of the records that satisfy the target criteria and values of the records that satisfy a candidate branch criteria. For example, the branch criteria for a particular branch node may be selected based on a goal of dividing the records associated with the particular branch node such that a majority of records associated with the particular branch node that meet the target criteria also meet the branch criteria and a majority of records associated with the particular branch node that do not meet the target criteria do not meet the branch criteria.

In some embodiments, the machine-learning system 120 may use the model 125 to generate one or more rules. For example, the refined decision tree may be pruned. A branch node of the refined decision tree may be pruned based on the branch node having more records associated with the branch node that do not meet the target criteria than records that do meet the target criteria. Following the pruning, one of the remaining branch nodes of the refined decision tree may be designated as a rule node. The rule may be based on the rule node. The rules may represent relationships between categories of the data set to the target criteria. For example, for a data set including categories of "gender," "age," "level of education," and a target category of "annual income," with a target criteria of "greater than $60,000," a rule may state that "for persons under 50 years of age, an education level greater than 12 years increases the likelihood of having an annual income of $60,000." The machine-learning system 120 may display the rule via the GUI 106.

In some embodiments, the machine-learning system 120 may use the model 125 to generate a prediction with respect to the target criteria for a hypothetical record which may or may not include a value for the target criteria. One or more hypothetical records may be generated and input into the machine-learning system 120 via the GUI 106. The machine-learning system 120 may make predictions for outcomes of the hypothetical record based on the model 125. In some embodiments, the machine-learning system 120 may present a proposed hypothetical record that may illustrate the rule, via the GUI 106. For example, if a rule states "for persons under 50 years of age, education level greater than 12 years increases the likelihood of earning $60,000 annually," the GUI 106 may display a hypothetical record showing the likelihood of a person under 50 years of age with 11 years of education earning greater than $60,000 annually. Additionally or alternatively the GUI 106 may display a hypothetical record including the likelihood of a person under 50 years of age with 13 years of education earning greater than $60,000 annually. In some embodiments, in either of these records, the hypothetical record may be modifiable, through the GUI 106, to further analyze the data set 108 and/or the applicability of the rule; such as, for example by specifying a gender, or state of residence.

Modifications, additions, or omissions may be made to the environment without departing from the scope of the present disclosure. For example, in some embodiments, data cleaning may be automated, or omitted. For another example, category selection, or the generation of a refined decision tree may be automated or omitted. For another example, operations involving displaying results of options may be omitted. Further, the order of operations may vary according to different implementations.

Figure 2A:
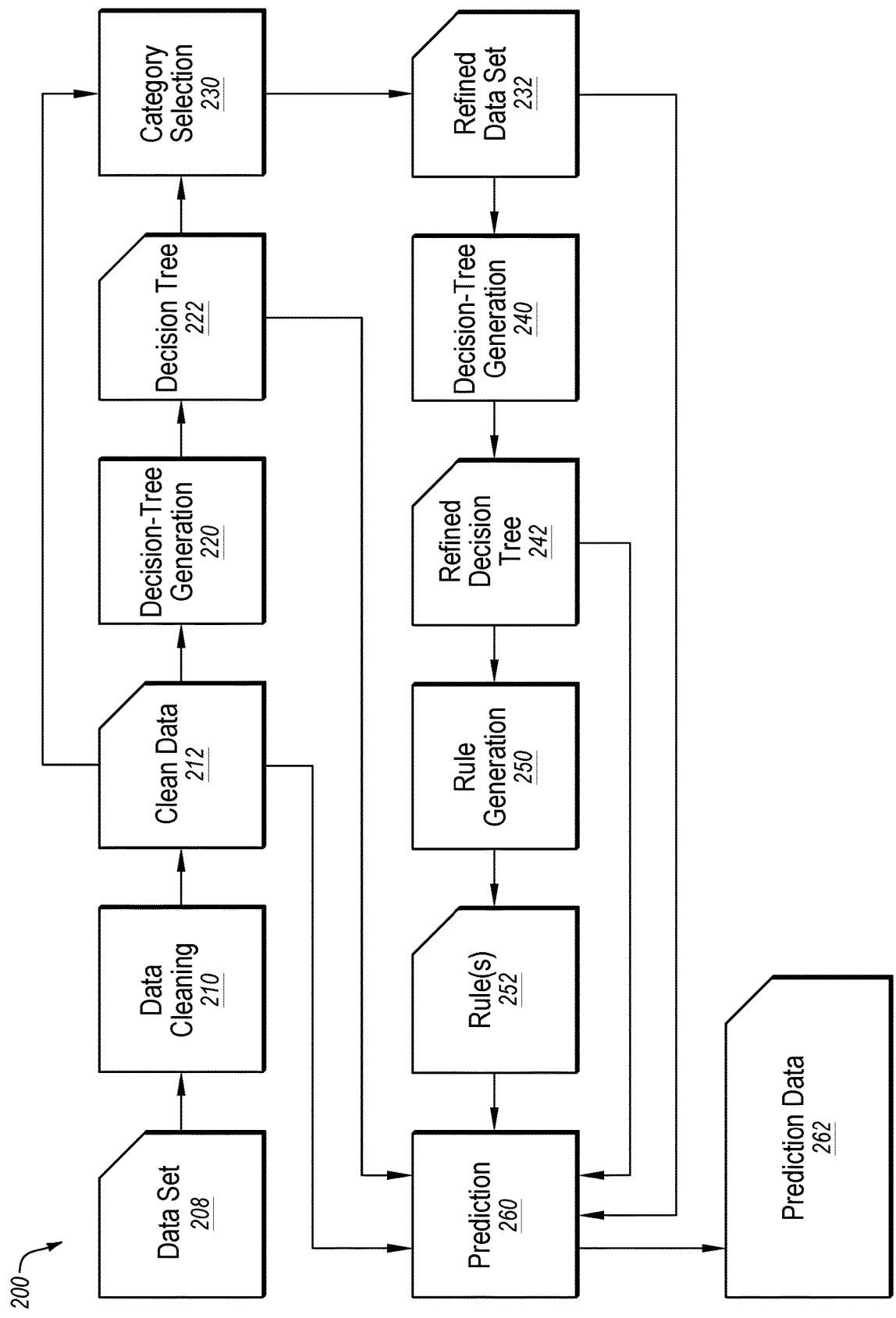
FIG. 2A is a block diagram of an example flow illustrating operations related to accessible machine learning.
Figure 2B:
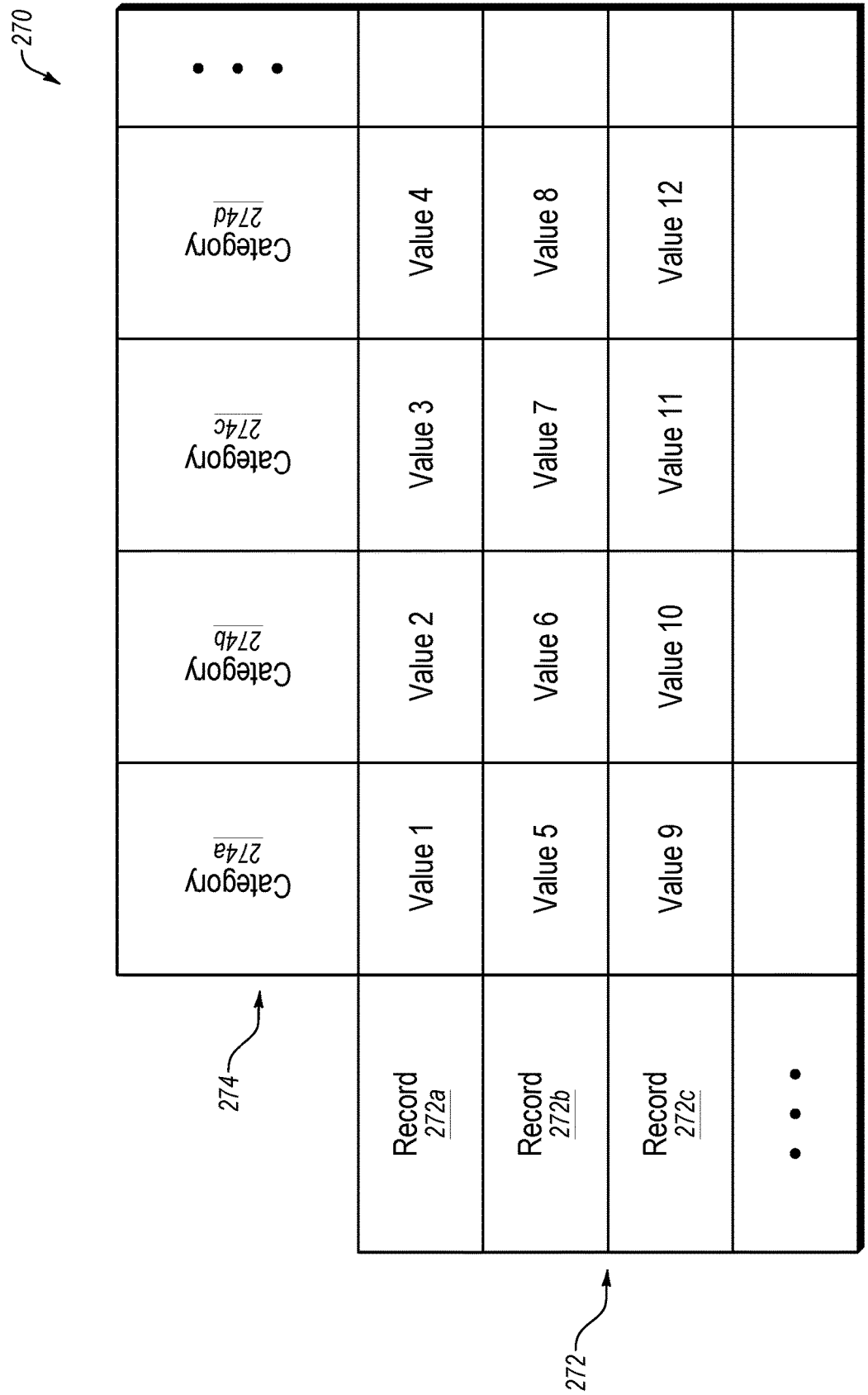
FIG. 2B is a block diagram of an example data set.
Figure 2C:
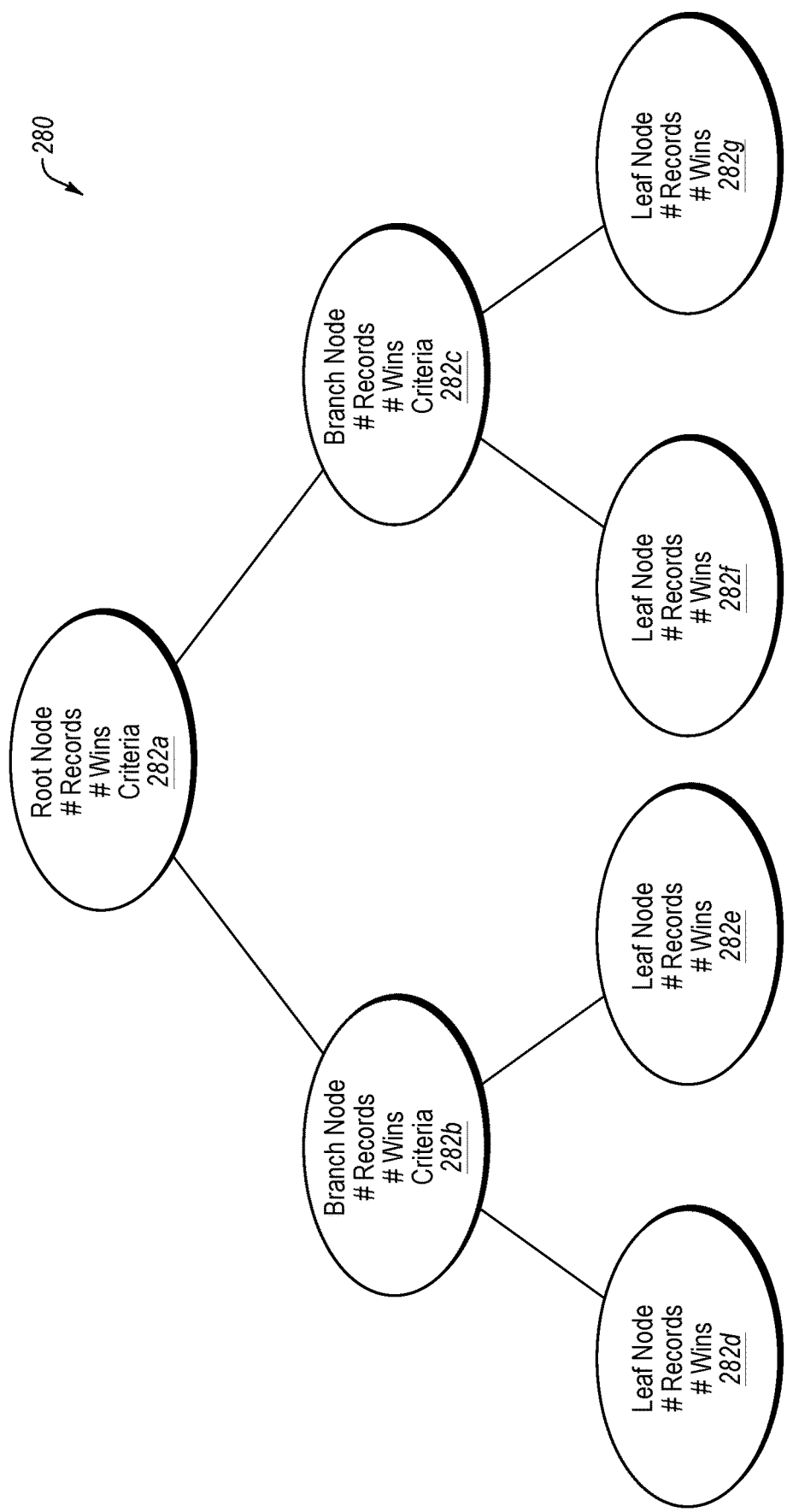
FIG. 2C is a block diagram of an example decision tree model.

FIG. 2A is a block diagram of an example flow 200 illustrating operations related to accessible machine learning according to at least one embodiment described in this disclosure. FIG. 2B illustrates an example of a data set that may be used in the flow 200 of FIG. 2A. FIG. 2C illustrates an example of a decision tree model that may be used in the flow 200 of FIG. 2A. In general, the flow 200 may take a data set 208 as an input and, after some processing, generate rules 252 and/or prediction data 262.

The data set 270 of FIG. 2B may be an example of the data set 208 of FIG. 2A or of the data set 108 of FIG. 1. The data set 270 includes a first record 272a, a second record 272b, and a third record 272c, collectively referred to as records 272. Each of the records may include categories 274. Four categories are illustrated in FIG. 2B: a first category 274a, a second category 274b, a third category 274c, and a fourth category 274d, collectively referred to as categories 274. While the data set 270 includes three records 272 and four categories 274, this is for illustrative purposes only. The number of records and categories may vary according to different implementations.

In some embodiments, each of the records 272 of the data set 270 may include a value corresponding to each of the categories 274. For example, the first record 272a may include a value 1 which may correspond to the first category 274a, and a value 2 which may correspond to the second category 274b. In some embodiments, one or more of the records 272 may not have a value in one or more of the categories 274. For example, the first record 272a may not include a value 3 corresponding to the third category 274c. Additionally or alternatively, the value 3 may be "null." In the present disclosure, it may be accurate to say that each the categories 274 has a value corresponding to each of the records 272. For example, the first category 274a may have the value 1 corresponding to the first record 272a, and the value 5 corresponding to the second record 272b.

In FIG. 2B the data set 270 is illustrated as a table, the records 272 are illustrated as rows, and the categories 274 are illustrated as columns. The presentation of the data set 270 in FIG. 2B is for illustration purposes. The data set 270 may take the form of any suitable data structure, such as, for example a vector, a list, an array, or a matrix, among others.

The values of the categories 274 may be based on the category 274 in which they are included. For example, the first category 274a may be a numerical category, such as, for example, "age." As another example, the second category 274b may be a character string category, such as, for example, "name." In some embodiments, some of the categories 274 may include data that can be one of a number of options. For example, the third category 274c may be "eye color," and all of the values of the category 3 may be selected from a list of colors.

The data set 270 may include a target category. The target category may be a category of the data set 270 that may have been designated as the target category. The target category may have been designated based on the specific task of the machine-learning system, the purpose of the model, or the question that the model is configured to analyze. For example, if the machine-learning system is performing the specific task of predicting income, the target category may be "annual income."

Returning now to FIG. 2A, during data cleaning 210, clean data 212 may be generated based on the data set 208. In general, during data cleaning 210, data may be removed from the data set 208 based on an indication that the data is not relevant to the target category or the target criteria. The data removed may include records, values, and/or categories. Alternatively or additionally, particular categories may not be relevant for a specific purpose of the machine-learning system. For example, in some embodiments, "gender" may be irrelevant to determine whether a loan should be granted. In some embodiments, a category of the data set 208 may be removed based on an indication of the irrelevance of the category to the target category or the target criteria. The indication of the irrelevance may be obtained from the GUI 106 of FIG. 1. In some embodiments, the indication of the irrelevance of a category may be automatically generated. In yet other embodiments, a combination of GUI-driven and automatically derived category removal methods may be used.

In some embodiments, the irrelevance of a category may be based on a low degree of discriminability relationships between the values of the category and the values of the target category, or the values of the target category that meet the target criteria. In some embodiments, the irrelevance of a category may be based on the irrelevant category being redundant. For example, an irrelevant category may have a high degree of correlation with another category in the data set and thus may not add additional information that may be used to predict information regarding the target category. In some embodiments, the irrelevance of a category may be based on the values of the irrelevant category being poorly handled, such as, for example, the data being corrupted or inaccurately reported or recorded in the records.

In some embodiments, during data cleaning 210 the irrelevant categories may be removed from the data set 208 to generate the clean data 212. In some embodiments, the irrelevant categories may be deleted or marked as irrelevant for the purposes of further processing.

In some embodiments, the flow 200 may include the decision-tree generation 220. In general, during decision-tree generation 220 the decision tree 222 may be generated using, or based on the clean data 212. The decision tree 222 may be generated according to any suitable method of decision tree generation, such as, for example, Iterative Dichotomiser 3 (ID3), Classification And Regression Tree (CART), or Chi-squared Automatic Interaction Detector (CHAID), among others. An example of a decision tree is given with regard to FIG. 2C.

FIG. 2C is a block diagram of an example decision tree model 280 according to at least one embodiment described in this disclosure. The decision tree model 280 includes seven nodes: root node 282a, first branch node 282b, second branch node 282c, first leaf node 282d, second leaf node 282e, third leaf node 282f, and fourth leaf node 282g, collectively referred to as nodes 282. While the decision tree model 280 includes seven nodes, this is for illustrative purposes only, the number of nodes, branch nodes, and/or leaf nodes may vary according to different implementations. In some embodiments, the decision tree model 280 may include layers of branch nodes. For example, a branch node may be a parent of another branch node.

In some embodiments, the decision tree may divide and subdivide records of the data set according to one or more criteria. For example, the decision tree model 280 may include branch nodes. Each branch node may include a branch criteria. The branch criteria may include a logical test that may apply to values of the data set. In some embodiments, each branch criteria may apply to values of one category. Example branch criteria include "age greater than 50 years old," "annual income greater than $60,000," or "gender is female." In some embodiments, edges of the decision tree may represent outcomes of the branch criteria. For example, the left edge of any branch node may correspond to records with values that meet the branch criteria. The right edge of any branch node may correspond to records with values that do not meet the branch criteria. Thus, for example, the first leaf node 282d may correspond to records with values that meet the branch criteria of the root node 282a and the first branch node 282b. As another example, the third leaf node 282f may correspond to records with values that do not meet the branch criteria of the root node 282a, but do meet the branch criteria of second branch node 282c.

In some embodiments, the root node may be associated with all of the records. Each branch node and each leaf node of the decision tree may be associated with a subset of records. For example, the root node 282a may be associated with all of the records of the data set. The first branch node 282b may be associated with the records that meet the branch criteria of the root node 282a. The second branch node 282c may be associated with the records that do not meet the branch criteria of the root node 282a.

In some embodiments, the decision tree model 280 may represent relationships between the values of the categories of the records and the target criteria. For example, the first leaf node 282d may represent the records that meet the branch criteria of the root node 282a and the branch criteria of the first branch node 282b. Information that the first leaf node 282d meets the branch criteria of the root node 282a and the first branch node 282b may be part of the representation of the relationship between values of the categories of the records and the target criteria. The first leaf node 282d may include information about how many of the records of the first leaf node 282d meet the target criteria, for example, as a percentage. Information about how many of the records of the first leaf node 282d meet the target criteria may be part of the representation of the relationship between values of the categories of the records and the target criteria.

Returning now to FIG. 2A, during some embodiments, the flow 200 may include the category selection 230. During category selection 230 categories of the clean data 212 may be selected. In general, during the category selection 230, the clean data 212 may be refined based on the decision tree 222 and based on relationships between the values of the categories and the target criteria. The category selection 230 may include the removal of one or more categories from the data set, which may be similar to the data cleaning 210. However, the category selection 230 may include more automation than the data cleaning 210. For example, the category selection 230 may include any suitable feature selection method such as, for example, a feature importance method, a univariate test, a filter method, a wrapper method or an embedded method, among other methods.

In some embodiments, during category selection 230 the categories of the clean data 212 may be ranked according to relationships between values of the ranked categories and values of the target category that meet the target criteria. For example, a category that has a high degree of discriminability relationship between the values of the category and values of the target category that meet the criteria may rank high. For example, a category such as "education level" may be highly correlated with the target category of "annual income" because multiple records that include a relatively high "education level" may also include a relatively high "annual income." Additionally or alternatively, the relationships may be an inverse relationships; for example, "felony convictions" may be inversely correlated with "annual income." Further, the category of "education level" may have a high degree of relationships with the target criteria of "annual income greater than $60,000." The feature importance method, for example, may rank categories according to the decision tree 222 and/or the relationships between the values of the ranked categories and the target criteria.

One or more low-ranking categories may be removed from records of the data set based on the ranking of the low-ranking categories. For example, the lowest ranking category may be removed from the data set. Additionally or alternatively the low-ranking categories may be removed based on the relationships between the low-ranking categories and the target criteria. For example, a first accuracy of the model in predicting whether records will meet the target criteria may be determined. Also, a second accuracy of the model without a low-ranking category in predicting whether records will meet the target criteria may be determined. If the second accuracy is within a threshold distance from the first accuracy, the low-ranking category may be removed. For example, if a particular category ranks low, and the accuracy of the model without the particular category in predicting whether records will meet the target criteria is within 5% accuracy of the model with the particular category in predicting whether records will meet the target criteria, then the particular category may be removed from the data set. The refined data set 232 may include the clean data 212 after the removal of the low-ranking categories.

In some embodiments, the flow 200 may include the decision-tree generation 240. In general, during decision-tree generation 240 the refined decision tree 242 may be generated based on the refined data set 232. The decision-tree generation 240 may be similar to, or the same as the decision-tree generation 220.

In some embodiments, the flow 200 may include the rule generation 250. In general, during the rule generation 250 one or more rules 252 based on the refined decision tree 242 may be generated.

In some embodiments, one or more of the branch nodes of the refined decision tree 242, or the decision tree 222, may be designated as rule nodes. One or more rules may be based on the branch criteria of the one or more rule nodes. The rule nodes may be designated from among the branch nodes based on the branch criteria of the rule nodes dividing records that meet the target criteria from records that do not meet the target criteria. In the present disclosure, records that meet the target criteria may be referred to as "wins." Also, in the present disclosure, records that do not meet the target criteria may be referred to as "losses." Also, in the present disclosure, the ratio of records associated with a particular node that meet the target criteria to the total number of records associated with the particular node may be referred to as "Pwin." Thus, the rule node may be designated based on the branch criteria of the rule node dividing wins from losses.

In some embodiments, the designation of a rule node from among the branch nodes may include one or more steps. In some embodiments, a list of nodes that includes the branch nodes and the leaf nodes that include a subset of records associated therewith that includes more records that include target values that do not meet the target criteria than records that include the first target values that meet the target criteria may be generated. For example, each of the branch nodes and the leaf nodes on the list may be associated with more records that do not meet the target criteria than records that do meet the target criteria. For example, the list of nodes may be the list of nodes that include more losses than wins.

In some embodiments, to come to the designation of the rule node, one or more nodes may be pruned from the list of nodes. The purpose of the pruning may be to determine which nodes and/or branch criteria provide information most relevant to the target criteria. Thus, the purpose of pruning may be to prune nodes from which less relevant information may be extracted, for example, redundant nodes.

In some embodiments, the node to be pruned may be selected for pruning based on the node to be pruned being a child node of a parent node that is on the list of nodes. For example, returning to FIG. 2C, if first leaf node 282d and first branch node 282b are on the list, the first leaf node 282d may be removed based on the first branch node 282b remaining on the list of nodes. In some embodiments, the first leaf node 282d may be removed because the first leaf node 282d may be redundant in view of the first branch node 282b. Additionally or alternatively, the first leaf node 282d may be removed because the first branch node 282b may represent more information, or information more relevant than the first leaf node 282d.

Additionally or alternatively, the node to be pruned may be selected for pruning based on the node to be pruned being a leaf node; but, a parent node of the leaf node may be added to the list if the parent node is not already on the list. For example, returning again to the FIG. 2C, if the third leaf node 282f is on the list, and the second branch node 282c is not on the list, the third leaf node 282f may be removed from the list and the second branch node 282c may be added to the list. In some embodiments, there may be less information relative to the target criteria to be gained from a leaf node than from a branch node at least because a leaf node may not include a branch criteria. Thus, by removing a leaf node, and adding a parent node, the list may gain information, or information more relevant to the target criteria.

Additionally or alternatively, the node to be pruned may be selected for pruning based on the node to be pruned representing a branch criteria of a category that has been designated as "unchangeable." In the present disclosure, nodes based on branch criteria, categories, or data that have been designated as unchangeable may be referred to as "unchangeable nodes." For example, if the branch criteria of the second branch node 282c is on a category of data that has been designated as unchangeable, the second branch node 282c may be removed from the list. As examples of categories that may be designated as unchangeable, a record's "age" category or "eye color" category may be designated as unchangeable. The designation of unchangeable may be made by through a GUI, such as, for example, the GUI 106 of FIG. 1. The designation of unchangeable may be based on a concept that the underlying data of the record cannot be changed without great difficulty. Such as, for example, a person on which a record is based may not change their eye color without great difficulty. Additionally or alternatively, for some purposes, a person on which a record is based cannot decrease their age. Unchangeable nodes may be utilized in certain analyses, and may not be utilized in other analyses. In these and other embodiments, unchangeable nodes may be removed from the list of nodes because the unchangeable nodes may provide information that is less related to the specific task of the machine-learning model than information of other branch nodes.

In some embodiments, after one or more nodes have been removed from the list of nodes, one or more remaining nodes may be designated as rule nodes.

In some embodiments, the rule may be based on the target criteria. For example, the rule may include criteria on one or more categories of the data that may cause a record to be more likely to meet the target criteria. For example, if the target criteria is "annual income greater than $60,000" the rule may include criteria on one or more categories that may increase the likelihood of a record having an "annual income greater than $60,000."

In some embodiments, the rule may be based on and include the branch criteria of the rule node. For example, if the branch criteria of the first branch node 282b may be "education level greater than 12 years," based on the Pwin of children nodes of the first branch node 282b, the rule may include "education level greater than 12 years."

Additionally or alternatively the rule may include preconditions. The preconditions of the rule may include the branch conditions of each of the parent nodes of the rule node. For example, returning again to FIG. 2C, if the branch criteria of the root node 282a is "age greater than 50," the rule may include the precondition "when age is greater than 50." For example, a rule may include "when age is greater than 50, to achieve an annual income of greater than $60,000, education level should be greater than 12 years."

In some embodiments, the rule may include or be based on one or more Pwins. For example, the rule may include "when age is greater than 50, to achieve 70% probability of an annual income of greater than $60,000, education level should be greater than 12 years." In some embodiments, the rule may include a comparison between Pwins. For example the rule may include "when age is greater than 50, to increase probability of having an annual income of greater than $60,000 by 60%, education level should be greater than 12 years."

In some embodiments, the flow 200 may include the prediction 260. In general, during the prediction 260, prediction data 262 may be generated based on the rules 252, the refined decision tree 242, the refined data set 232, the decision tree 222, and/or the clean data 212. In some embodiments, prediction data 262 may be made based solely on the rules 252. The prediction data 262 based solely on the rules 252 may be quicker to produce than other prediction data 262. Additionally or alternatively the prediction data 262 may be based on the refined decision tree 242. The prediction data 262 based on the refined decision tree 242 may include generating results using the machine-learning model, for example, the refined decision tree 242.

In some embodiments, the prediction data 262 may be based on hypothetical records. For example, a hypothetical record, which may not contain a value in the target category may be obtained. In some embodiments, a value of the target category of the hypothetical record may be generated. The value of the target category of the hypothetical record may include a range, or a probability. In other embodiments, no value of the target category of the hypothetical record may be generated. Rather, in these or other embodiments, the hypothetical record may be evaluated in terms of the probability that the hypothetical record would include a hypothetical value of the target category that would meet the target criteria. For example, a hypothetical record may include "age" of "50 years" and "education level" of "11 years." The prediction data 262 based on the hypothetical data may include a prediction of the likelihood of the record with "age" of "50 years" and education level of "11 years" including an "annual income" of greater than "$60,000" such as, for example, "10%."

Modifications, additions, or omissions may be made to the flow 200 without departing from the scope of the present disclosure. For example, in some embodiments, the data cleaning 210 may be omitted. In these or other embodiments, the category selection 230 may "remove additional categories from the data set." For another example, the category selection 230 and the decision-tree generation 240 may be omitted. In these or other embodiments, the rule generation 250 may be based on the decision tree 222. Further, the order of operations may vary according to different implementations.

Figure 3:
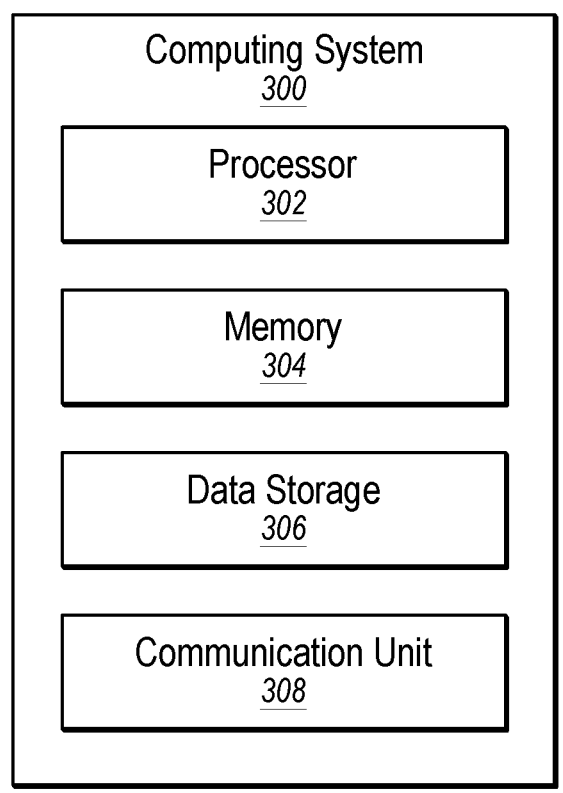
FIG. 3 is a block diagram of an example computing system.

FIG. 3 is a block diagram of an example computing system 300, which may be arranged in accordance with at least one embodiment described in this disclosure. As illustrated in FIG. 3, the computing system 300 may include a processor 302, a memory 304, a data storage 306, and a communication unit 308.

Generally, the processor 302 may include any suitable special-purpose or general-purpose computer, computing entity, or processing device including various computer hardware or software modules and may be configured to execute instructions stored on any applicable computer-readable storage media. For example, the processor 302 may include a microprocessor, a microcontroller, a digital signal processor (DS), an application-specific integrated circuit (ASIC), a Field-Programmable Gate Array (FPGA), or any other digital or analog circuitry configured to interpret and/or to execute program instructions and/or to process data. Although illustrated as a single processor in FIG. 3, it is understood that the processor 302 may include any number of processors distributed across any number of network or physical locations that are configured to perform individually or collectively any number of operations described herein. In some embodiments, the processor 302 may interpret and/or execute program instructions and/or process data stored in the memory 304, the data storage 306, or the memory 304 and the data storage 306. In some embodiments, the processor 302 may fetch program instructions from the data storage 306 and load the program instructions in the memory 304. After the program instructions are loaded into the memory 304, the processor 302 may execute the program instructions, such as instructions to perform one or more operations described with respect to the flow 200 the method 400, and/or the method 500 of FIGS. 2A, 4, and 5 respectively.

The memory 304 and the data storage 306 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 302. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations.

The communication unit 308 may be configured to receive records, data sets, and/or hypothetical data sets and to provide the records, data sets, and/or hypothetical data sets to the data storage 306. The communication unit 308 may include any device, system, component, or collection of components configured to allow or facilitate communication between the computing system 300 and a network. For example, the communication unit 308 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. The communication unit 308 may permit data to be exchanged with any such as a cellular network, a Wi-Fi network, a MAN, an optical network, etc., to name a few examples, and/or any other devices described in the present disclosure, including remote devices.

Modifications, additions, or omissions may be made to the computing system 300 without departing from the scope of the present disclosure. For example, the data storage 306 may be located in multiple locations and accessed by the processor 302 through a network.

Figure 4A:
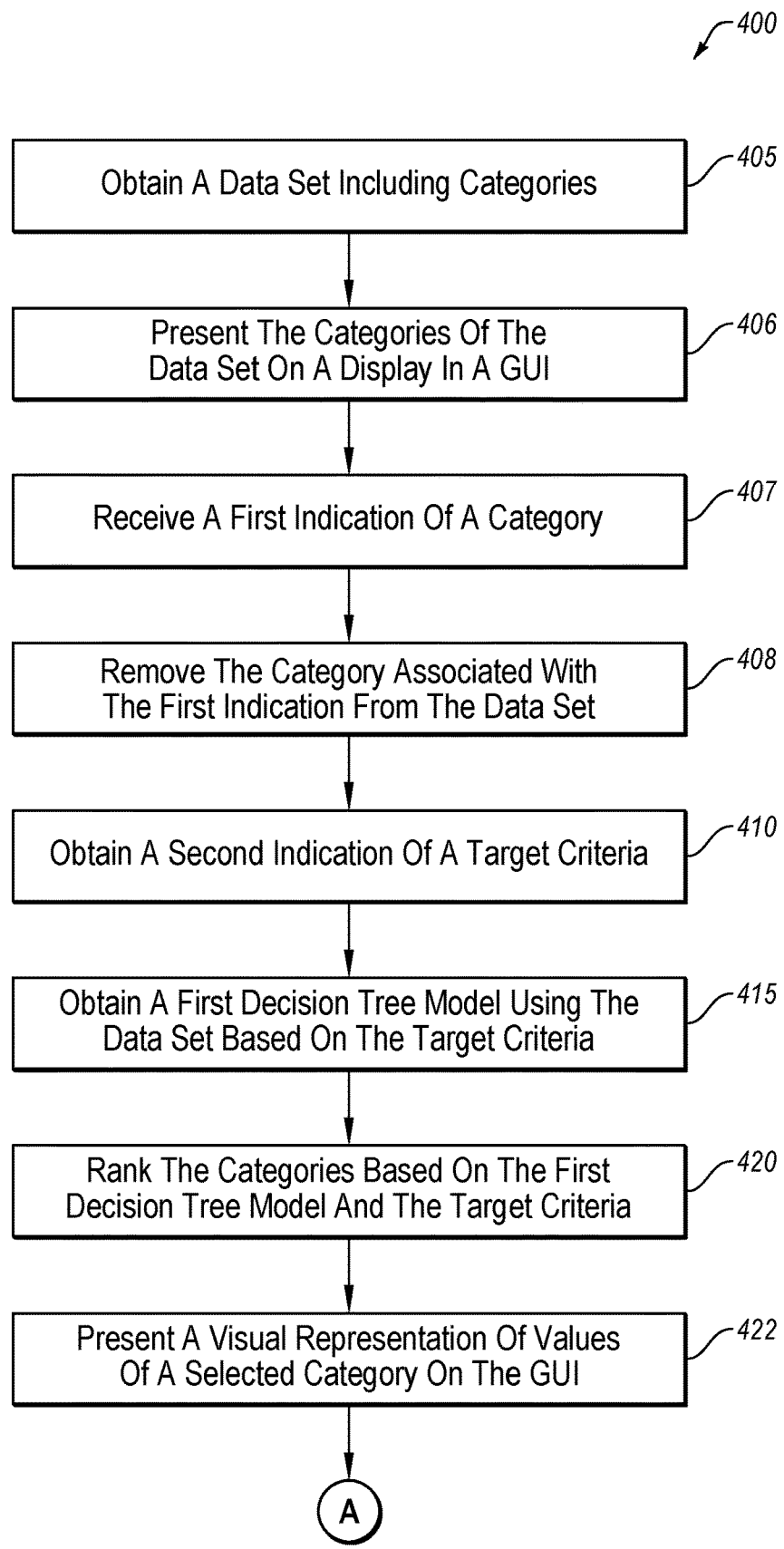
FIGS. 4A-4C illustrate a flow chart of an example method of accessible machine learning.
Figure 4B:
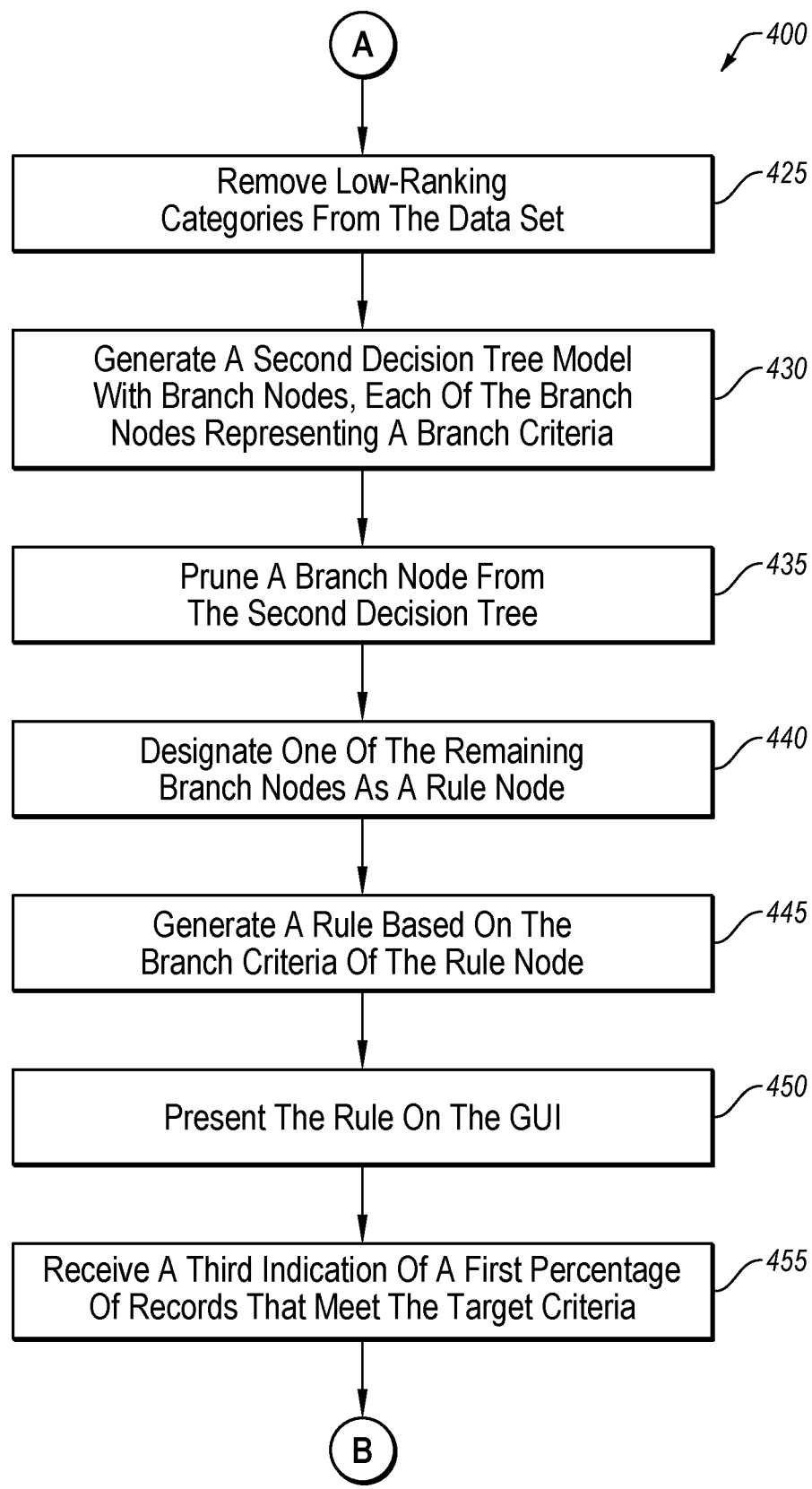
Figure 4C:
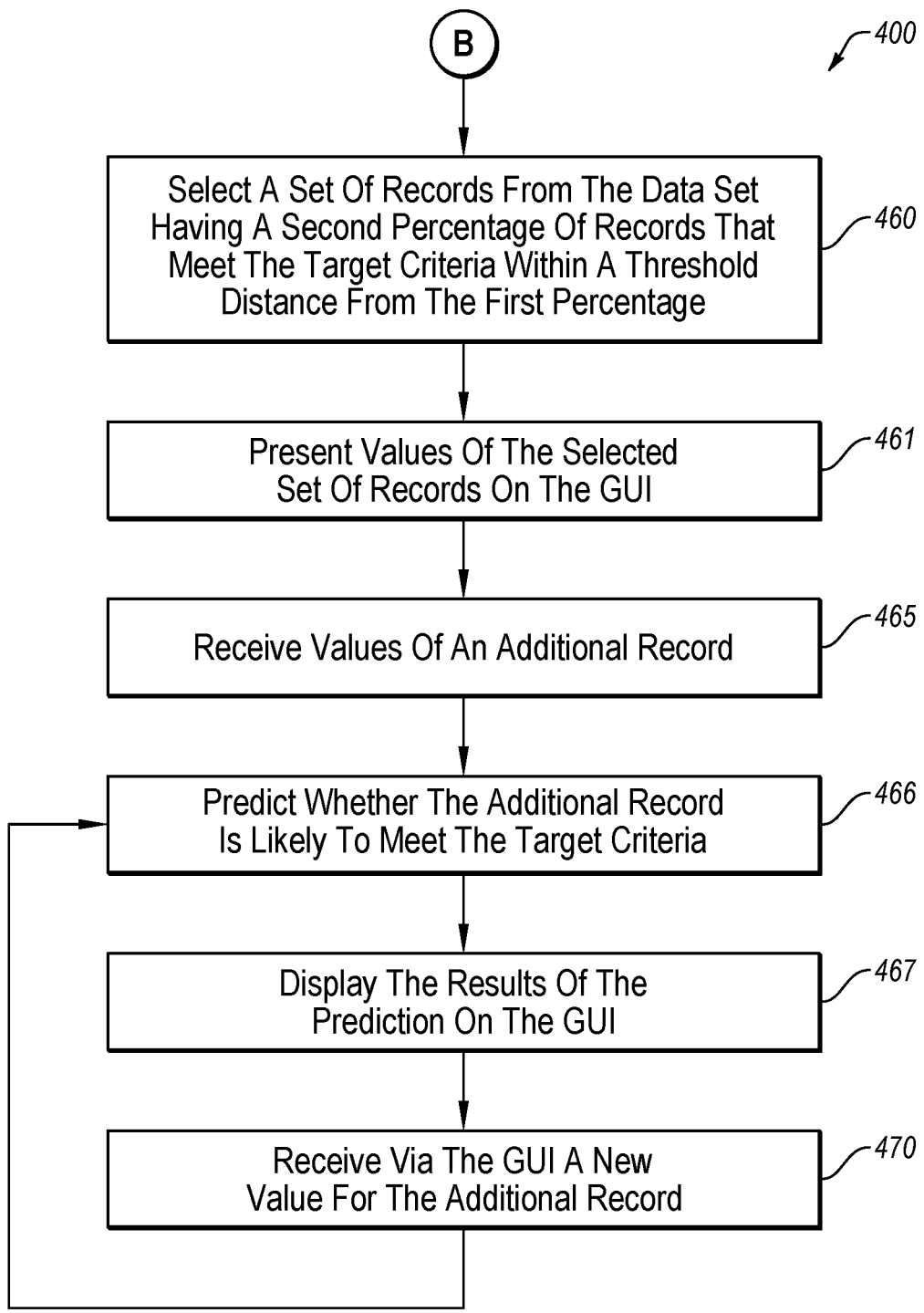

FIGS. 4A, 4B, and 4C illustrate a flow chart of an example method 400 configured to perform operations associated with machine learning, arranged in accordance with at least one embodiment described in this disclosure. In some embodiments, one or more of the operations associated with the method 400 may be performed as part of the flow 200 of FIG. 2A. The method 400 may be performed by any suitable system, apparatus, or device. For example, the computing system 300 of FIG. 3, or the computing system 100 of FIG. 1, may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation. In general, the method 400 may obtain a data set, generate a rule based on the data set, and present the rule on a display.

With reference to FIG. 4A, at block 405, a data set may be obtained. As described above, the data set may be obtained or selected through a GUI, such as, for example, the GUI 106 of FIG. 1. The data set may include multiple records, where each of the records may include one or more categories. For example, with reference to FIG. 2B, the data set 270 may include the records 272 that may include the categories 274.

At block 406, the categories of the data set may be presented on a display of the GUI.

At block 407, an indication of a presented category may be received. For example, a user may make a selection of one or more of the categories to indicate that the selected categories or values within selected categories are to be removed from the data set.

At block 408, the indicated category may be removed from the records of the data set.

At block 410, an indication of a target criteria may be obtained. For example, one or more categories may be presented on the display of the GUI. The user may indicate a category to be designated as the target category by selecting a category on the display of the GUI. Additionally or alternatively, the user may input a target criteria via the GUI. The target criteria may include a criteria relative to the target category that may be of interest. The records of the data set may include values of the target category that may be referred to as target values.

At block 415, a first decision tree model may be obtained. The first decision tree model (such as the decision tree model 280 of FIG. 2C) may represent relationships between the values of the categories of the records and the target criteria. In some embodiments, the first decision tree model may be obtained using the data set or may otherwise be based on the data set. As described above, the relationships between the values of the categories of the records and the target criteria may include branch criteria and a number of records that meet the target criteria. For example, the relationship may include a number of records that meet both a branch criteria and the target criteria.

At block 420, the categories of the data set may be ranked based on the first decision tree model and based on relationships between values of the ranked categories and the target criteria. For example, the relationship may include a correlation relationship between values of the categories in records that include target values that meet the target criteria. For example, the correlation relationship may include records that include high numerical values in a category as well as target values that meet the target criteria. One or more of the high numerical values in the category may be correlated to other records with high numerical values of the category. In some embodiments, the categories may be ranked by this or other feature selection methods.

At block 422, a visual representation of values of a selected category of the data set may be presented on the display in the GUI. The visual representation may be based on the relationships between the values of the selected category and the target values. For example, one or more categories may be displayed on the GUI in a manner that the user may interact with the GUI to select a category. The visual representation of the selected category may be generated and displayed on the GUI. The display may demonstrate the relationships between the selected category and the target category, the target values, and/or the target criteria.

With reference to FIG. 4B, at block 425, one or more low-ranking categories may be removed from the records of the data set based on the ranking of the low-ranking categories. Additionally or alternatively the low-ranking categories may be removed based on a correlation relationship between the low-ranking categories and the target criteria. For example, the lowest-ranking category may be analyzed to determine a correlation relationship between the lowest-ranking category and the target criteria. If the correlation relationship between the lowest-ranking category and the target criteria is below a threshold, the lowest-ranking category may be removed from the records of the data set.

At block 430, a second decision tree model may be generated using the data set after the removal of the low-ranking categories. The second decision tree model may include a root node, one or more leaf nodes, and one or more branch nodes. For example, with reference to FIG. 2C, the decision tree model 280 may include a root node 282a, and branch nodes 282b and 282c, and leaf nodes 282d, 282e, 282f, and 282g. Each of the branch nodes may represent a branch criteria of one of the categories. The branch criteria for each of the branch nodes may be generated based on relationships between target values that meet the target criteria and values of the other categories that meet a candidate branch criteria. The branch criteria for each of the branch nodes may be selected as part of the generation of the second decision tree model.

At block 435, a branch node of the branch nodes may be pruned. The purposes of pruning may include removing a branch node that may provide less information relevant to the target criteria than another branch node. In some embodiments, the pruned branch node may be selected for pruning based on the records associated with the pruned branch node including more records that do not meet the target criteria than records that meet the target criteria. For example, the pruned branch node may be selected for pruning based on the pruned branch node being associated with more losses than wins. In some embodiments, more than one branch node may be pruned.

At block 440, at least one branch node of the remaining branch nodes may be designated as a rule node based upon which a rule may be generated. After the pruning of the pruned branch node, or the pruned branch nodes, the remaining branch nodes may provide more information, relative to the target criteria, than the pruned branch node, or the pruned branch nodes. The designation of at least one of the remaining branch nodes as the rule node may be based on the remaining branch nodes providing more information, relative to the target criteria, than the pruned branch node, or pruned branch nodes.

At block 445, a rule may be generated based on the branch criteria of the rule node. For example, the rule may include a statement or expression including a relationship between values of a category that meet the branch criteria, and target values that meet the target criteria. In some embodiments, the rule may include a representation of the relationships between one or more categories and the target criteria. In these and other embodiments, the rule may include a precondition based on one or more parent nodes of the rule node. Additionally or alternatively the rule may include a post-condition based on the branch criteria of the rule node. For example, the rule may include a "when" clause that may relate to the precondition, and a "then" clause relating to the post-condition.

At block 450, the rule may be presented on the display in the GUI.

At block 455, an indication of a first percentage of records that have values of the target category that meet the target criteria may be received from the GUI. For example, an indication of a first Pwin may be input into the GUI.

With reference to FIG. 4C, at block 460 a set of records may be selected from the data set. For example, the set of records may be selected based on the set of records including a second percentage of records that meet the target criteria, where the second percentage may be closer to the first percentage of block 455 than one or more other percentages of other sets of records that meet the target criteria. Additionally or alternatively, the second percentage may be within a threshold distance of the first percentage. For example, a set of records may be selected from the data set that include a second Pwin that is within a threshold distance, for example 5%, from a first Pwin of block 455.

At block 461, one or more values of the set of records may be presented on the display of the GUI.

At block 465, values of an additional record not included in the data set may be received. The additional record may be a hypothetical record that may aid in demonstrating the applicability of the rule to the user. Additionally or alternatively, the GUI may provide alternate methods to change records from the less desirable classes to the more desirable classes through other manipulations of the data not suggested by the machine learning model. Through the GUI. In some embodiments, the values of the additional record may be based on or otherwise related to the set of records selected at block 460. In some embodiments, the additional record may be related to the rule, for example the additional record may include values that may demonstrate the applicability of the rule. Each of the values of the additional record may correspond to one of a subset of the categories of the records. The subset of categories may or may not include the target category. For example, in some instances, an additional record may include values in each of the categories of the data set except the target category.

At block 466, a prediction may be made regarding the likelihood that the additional record may meet the target criteria based on the values of the additional record.

At block 467, the prediction may be displayed on the display of the GUI.

At block 470, a new value for one of the categories of the additional record may be received from the GUI. For example, a value for one of the categories of the additional record may be changed. The value may be changed by a user interacting with the GUI to make changes to the additional record displayed on the GUI.

Additionally or alternatively, the method 400 may include predicting whether the additional record is likely to meet the target criteria based on the values of the additional record including the new value. The prediction regarding the new value may occur in a manner similar or comparable to that described above for block 466, but performed based on the new value. Additionally or alternatively, the method 400 may include displaying at the GUI results of the prediction. The displaying of the prediction regarding the new value may occur in a manner similar or comparable to that described above for block 467.

Modifications, additions, or omissions may be made to the method 400 without departing from the scope of the present disclosure. For example, in some embodiments, the block 410 may be omitted or may occur before, or at substantially the same time as the block 405. For example, when the data set is obtained, the target category, and/or the target criteria may be obtained or known beforehand. As another example, the block 415, the block 420, and the block, 425 may be omitted. In these or other embodiments, the second decision tree model may be generated without the need for a first decision tree model. Further, the order of operations may vary according to different implementations. For example, the block 410 may occur prior to the block 406, such as, for example at substantially the same time as the block 405. As another example, the block 410 may occur after the block 406 and prior to, or at substantially the same time as, the block 407.

Figure 5:
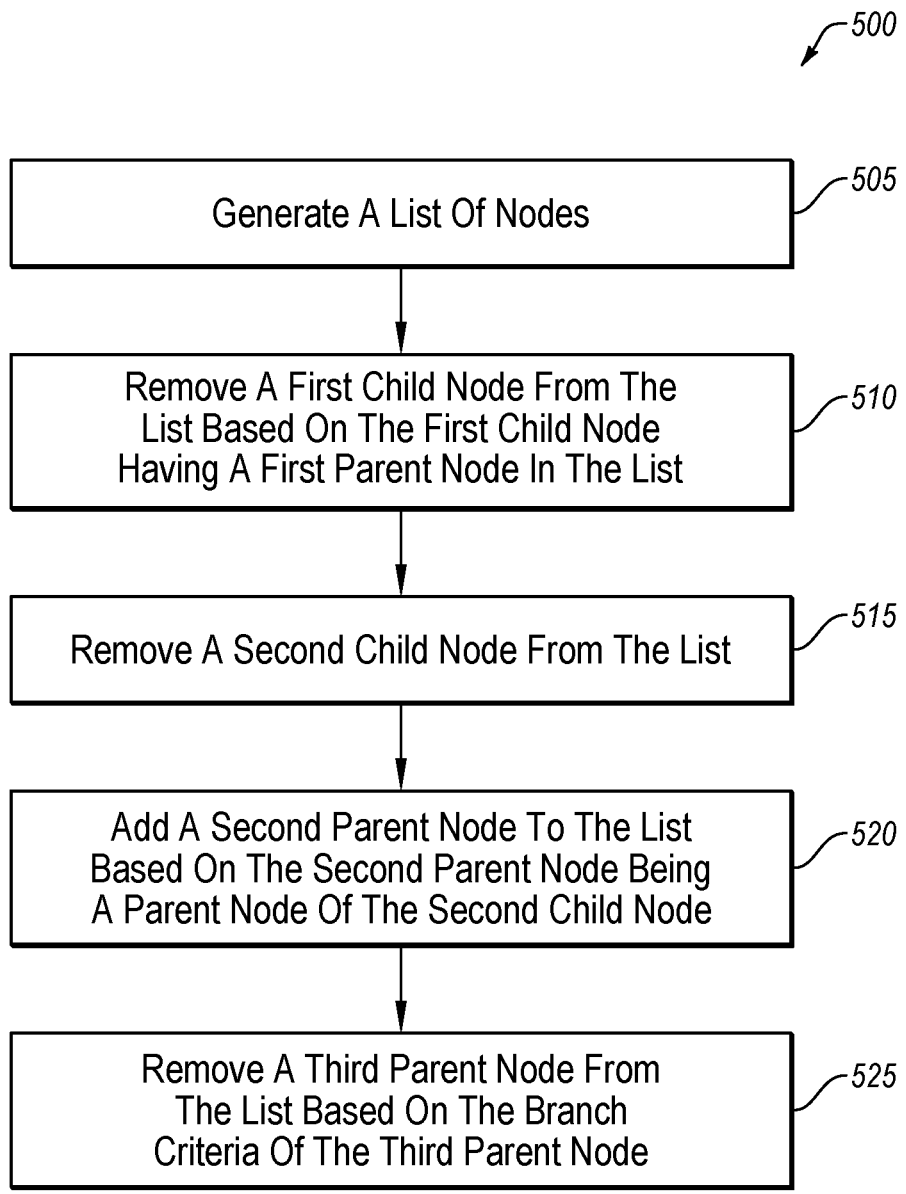
FIG. 5 is a flow chart of an example method of pruning a branch node from a decision tree model.

FIG. 5 is a flow chart of an example method 500 configured to perform operations associated with pruning a branch node from a decision tree, according to at least one embodiment described in this disclosure. In some embodiments, one or more of the operations associated with the method 500 may be performed as part of the flow 200 of FIG. 2A. The method 500 may be performed by any suitable system, apparatus, or device. For example, the computing system 300 of FIG. 3, or the computing system 100 of FIG. 1, may perform one or more of the operations associated with the method 500. Although illustrated with discrete blocks, the steps and operations associated with one or more of the blocks of the method 500 may be divided into additional blocks, combined into fewer blocks, or eliminated, depending on the desired implementation. In general, the method 500 may generate a list of nodes and remove one or more nodes from the list of nodes. In some embodiments the method 500 may be part of or included in the method 400 of FIG. 4. For example, the method 500 may be an example of one implementation of the block 435 of the method 400 of FIG. 4.

At block 505, a list of nodes including branch nodes and/or leaf nodes of a decision tree may be generated. For example, in an implementation of the block 435 of FIG. 4, the decision tree may correspond to the second decision tree of the method 400 of FIG. 4. In these or other embodiments, the decision tree may correspond to the first decision tree of the method 400 of FIG. 4.

In these and other embodiments, each node of the list of nodes may be associated with a set of records, and each set of records may include more records that include target values that do not meet the target criteria than records that include target values that do meet the target criteria. For example, the list of nodes may include the branch nodes and leaf nodes of the decision tree that are associated with more losses than wins.

At block 510, a first child node may be removed from the list of nodes based on the first child node having a first parent node in the list of nodes. For example, the first child node may be removed because the first child node may be redundant in view of the first parent node. Additionally or alternatively, the first child node may be removed because the first parent node may include more information, or more relevant information than the first child node.

At block 515, a second child node may be removed from the list of nodes. For example, the second child node may be removed based on the second child node being a leaf node, for example, there may be less information relative to the target criteria to be gained from a leaf node than from a branch node.

At the block 520, a second parent node may be added to the list of nodes. In these and other embodiments, the second parent node may include the branch criteria that resulted in the second child node. In some embodiments, the second parent node may not be included on the list of nodes prior to the block 520. In some embodiments, there may be information relative to the target criteria gained by adding a parent node to the list of nodes.

At block 525, a node may be removed from the list of nodes based on the data on which the branch category of the node is based being designated as "unchangeable." In these and other embodiments, unchangeable nodes may be removed from the list of nodes because the unchangeable nodes may provide information that is less related to the specific task of the machine-learning model than the information of other branch nodes.

Modifications, additions, or omissions may be made to the method 500 without departing from the scope of the present disclosure. For example, in some embodiments, the blocks 510, or 525 may be omitted. For another example, the block 515 and the block 520 may be omitted. Further, the order of operations may vary according to different implementations.

One skilled in the art will appreciate that, for the flow 200, the method 400, the method 500 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

The embodiments described herein may include the use of a special-purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. In these and other embodiments, the term "non-transitory" as explained herein should be construed to exclude only those types of transitory media that were found to fall outside the scope of patentable subject matter in the Federal Circuit decision of *In re Nuijten,* 500 F.3d 1346 (Fed. Cir. 2007). Combinations of the above may also be included within the scope of computer-readable media.

Computer-executable instructions comprise, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    obtaining a data set that includes a plurality of records, each of the records including values in a plurality of categories, one of the plurality of categories being a target category;
    obtaining an indication of a target criteria where a first set of records of the plurality of records each include a first target value of the target category that meets the target criteria;
    obtaining a first decision tree model using the data set, the first decision tree model representing relationships between the values of the categories of the records and the target criteria;
    ranking the plurality of categories based on the first decision tree model and based on relationships between values of the ranked categories and the target criteria;
    removing one or more low-ranking categories from the records of the data set based on the ranking of the low-ranking categories;
    generating a second decision tree model using the data set with the low-ranking categories removed from the data set, the second decision tree model including a root node, a plurality of leaf nodes, and a plurality of branch nodes, each of the plurality of branch nodes representing a branch criteria of one of the plurality of categories, the branch criteria for each of the plurality of branch nodes selected based on relationships between the first target values that meet the target criteria and values of the one of the plurality of categories that meet the branch criteria;
    pruning a branch node of the plurality of branch nodes, the pruned branch node selected for pruning based on a second set of records of the data set associated with the pruned branch node including more records that include second target values that do not meet the target criteria than records of the first set of record that include the first target values that meet the target criteria;
    designating at least one of the remaining branch nodes as a rule node;
    generating a rule based on the branch criteria of the rule node; and
    presenting the rule on a display in a graphical user interface.

2. The method of claim 1, further comprising:
    presenting the plurality of categories of the data set on the display in the graphical user interface;
    receiving from the graphical user interface an indication of a category; and
    removing the category from records of the data set.

3. The method of claim 1, wherein the method further comprises presenting on the display in the graphical user interface a visual representation of values of a selected category of the data set based on relationships between the values of the selected category and target values.

4. The method of claim 1, further comprising:
    generating a list of nodes that includes the plurality of branch nodes and the plurality of leaf nodes that include a subset of records associated therewith that includes more records that include third target values that do not meet the target criteria than records of the first set of records that include the first target values that meet the target criteria;
    removing a first child node from the list of nodes based on the first child node having a first parent node in the list of nodes;
    removing a second child node from the list of nodes; and
    adding a second parent node to the list of nodes, the second parent node being a parent node of the second child node.

5. The method of claim 1, wherein the rule includes a precondition based on a parent nodes of the rule node and a post-condition based on the branch criteria of the rule node.

6. The method of claim 1, the method further comprising:
    receiving from the graphical user interface an indication of a first percentage of records that have values of the target category that meet the target criteria;
    selecting a second set of records from the data set, the second set of records having a second percentage of records that meet the target criteria, wherein the second percentage is within a threshold distance of the first percentage; and
    presenting on the display in the graphical user interface one or more values of the second set of records.

7. The method of claim 1, the method further comprising:
    receiving a plurality of values of an additional record not included in the data set, each of the plurality of values corresponding to a different one of a subset of the categories of the plurality of records, the subset of categories not including the target category;
    predicting whether the additional record is likely to include a third target value that meets the target criteria based on the plurality of values of the additional record; and
    displaying at the graphical user interface results of the predicting whether the additional record is likely to meet the target criteria.

8. The method of claim 7, the method further comprising:
    receiving from the graphical user interface a new value for one of the subset of the categories, of the additional record;

predicting whether the additional record including the new value is likely to include a fourth target value that meets the target criteria based on the plurality of values of the additional record including the new value; and displaying at the graphical user interface results of the predicting whether the additional record including the new value is likely to meet the target criteria.

9. At least one non-transitory computer-readable media configured to store one or more instructions that when executed by at least one processor cause or direct a system to perform the method of claim 1.

10. At least one non-transitory computer-readable media configured to store one or more instructions that when executed by at least one processor cause or direct a system to perform operations, the operations comprising:
   obtaining a data set that includes a plurality of records, each of the records including values in a plurality of categories, one of the plurality of categories being a target category;
   obtaining an indication of a target criteria where a first set of records of the plurality of records each include a first target value of the target category that meets the target criteria;
   generating a decision tree model using the data set, the decision tree model including a root node, a plurality of leaf nodes, and a plurality of branch nodes, each of the plurality of branch nodes representing a branch criteria of one of the plurality of categories, the branch criteria for each of the plurality of branch nodes selected based on relationships between the first target values that meet the target criteria and values of the one of the plurality of categories that meet the branch criteria;
   pruning a branch node of the plurality of branch nodes, the pruned branch node selected for pruning based on a second set of records of the data set associated with the pruned branch node including more records that include second target values that do not meet the target criteria than records of the first set of records that include the first target values that meet the target criteria;
   designating at least one of the remaining branch nodes as a rule node;
   generating a rule based on the branch criteria of the rule node; and
   presenting the rule on a display in a graphical user interface.

11. The non-transitory computer-readable media of claim 10, wherein the operations further comprise prior to the generating the decision tree model:
   obtaining a second decision tree model using the data set;
   ranking the plurality of categories based on the second decision tree model and based on relationships between values of the ranked categories and the target criteria; and
   removing one or more low-ranking categories from the records of the data set based on the ranking of the low-ranking categories,
wherein generating the decision tree model using the data set is based on the data set with the low-ranking categories removed from the data set.

12. The non-transitory computer-readable media of claim 10, wherein the operations further comprise:
   presenting the plurality of categories of the data set on the display in the graphical user interface;
   receiving from the graphical user interface an indication of a category; and
   removing the category from records of the data set.

13. The non-transitory computer-readable media of claim 10, wherein the operations further comprise presenting on the display in the graphical user interface a visual representation of values of a selected category of the data set based on relationships between the values of the selected category and target values.

14. The non-transitory computer-readable media of claim 10, wherein the operations further comprise:
   generating a list of nodes that includes the plurality of branch nodes and the plurality of leaf nodes that include a subset of records associated therewith that includes more records that include third target values that do not meet the target criteria than records of the first set of records that include the first target values that meet the target criteria;
   removing a first child node from the list of nodes based on the first child node having a first parent node in the list of nodes;
   removing a second child node from the list of nodes; and
   adding a second parent node to the list of nodes, the second parent node being a parent node of the second child node.

15. The non-transitory computer-readable media of claim 10, wherein the rule includes a precondition based on a parent nodes of the rule node and a post-condition based on the branch criteria of the rule node.

16. The non-transitory computer-readable media of claim 10, wherein the operations further comprise:
   receiving from the graphical user interface an indication of a first percentage of records that have values of the target category that meet the target criteria;
   selecting a second set of records from the data set, the second set of records having a second percentage of records that meet the target criteria, wherein the second percentage is within a threshold distance of the first percentage; and
   presenting on the display in the graphical user interface one or more values of the second set of records.

17. The non-transitory computer-readable media of claim 10, wherein the operations further comprise:
   receiving a plurality of values of an additional record not included in the data set, each of the plurality of values corresponding to a different one of a subset of the categories of the plurality of records, the subset of categories not including the target category;
   predicting whether the additional record is likely to include a third target value that meets the target criteria based on the plurality of values of the additional record; and
   displaying at the graphical user interface results of the predicting whether the additional record is likely to meet the target criteria.

18. The non-transitory computer-readable media of claim 17, wherein the operations further comprise:
   receiving from the graphical user interface a new value for one of the subset of the categories, of the additional record;
   predicting whether the additional record including the new value is likely to include a fourth target value that meets the target criteria based on the plurality of values of the additional record including the new value; and
   displaying at the graphical user interface results of the predicting whether the additional record including the new value is likely to meet the target criteria.

19. A system comprising:
   one or more computer-readable media configured to store one or more instructions; and one or more processors coupled to the one or more computer-readable media, the one or more processors configured to execute the one or more instructions to cause or direct the system to perform operations comprising:

obtaining a data set that includes a plurality of records, each of the records including values in a plurality of categories, one of the plurality of categories being a target category;

obtaining an indication of a target criteria where a first set of records of the plurality of records each include a first target value of the target category that meets the target criteria;

generating a decision tree model using the data set, the decision tree model including a root node, a plurality of leaf nodes, and a plurality of branch nodes, each of the plurality of branch nodes representing a branch criteria of one of the plurality of categories, the branch criteria for each of the plurality of branch nodes selected based on relationships between the first target values that meet the target criteria and values of the one of the plurality of categories that meet the branch criteria;

pruning a branch node of the plurality of branch nodes, the pruned branch node selected for pruning based on a second set of records of the data set associated with the pruned branch node including more records that include second target values that do not meet the target criteria than records of the first set of records that include the first target values that meet the target criteria;

designating at least one of the remaining branch nodes as a rule node;

generating a rule based on the branch criteria of the rule node; and presenting the rule on a display in a graphical user interface.

20. The system of claim 19, wherein the operations further comprise:

generating a list of nodes that includes the plurality of branch nodes and the plurality of leaf nodes that include a subset of records associated therewith that includes more records that include third target values that do not meet the target criteria than records of the first set of records that include the first target values that meet the target criteria;

removing a first child node from the list of nodes based on the first child node having a first parent node in the list of nodes;

removing a second child node from the list of nodes; and adding a second parent node to the list of nodes, the second parent node being a parent node of the second child node.

* * * * *